Patented Dec. 5, 1922.

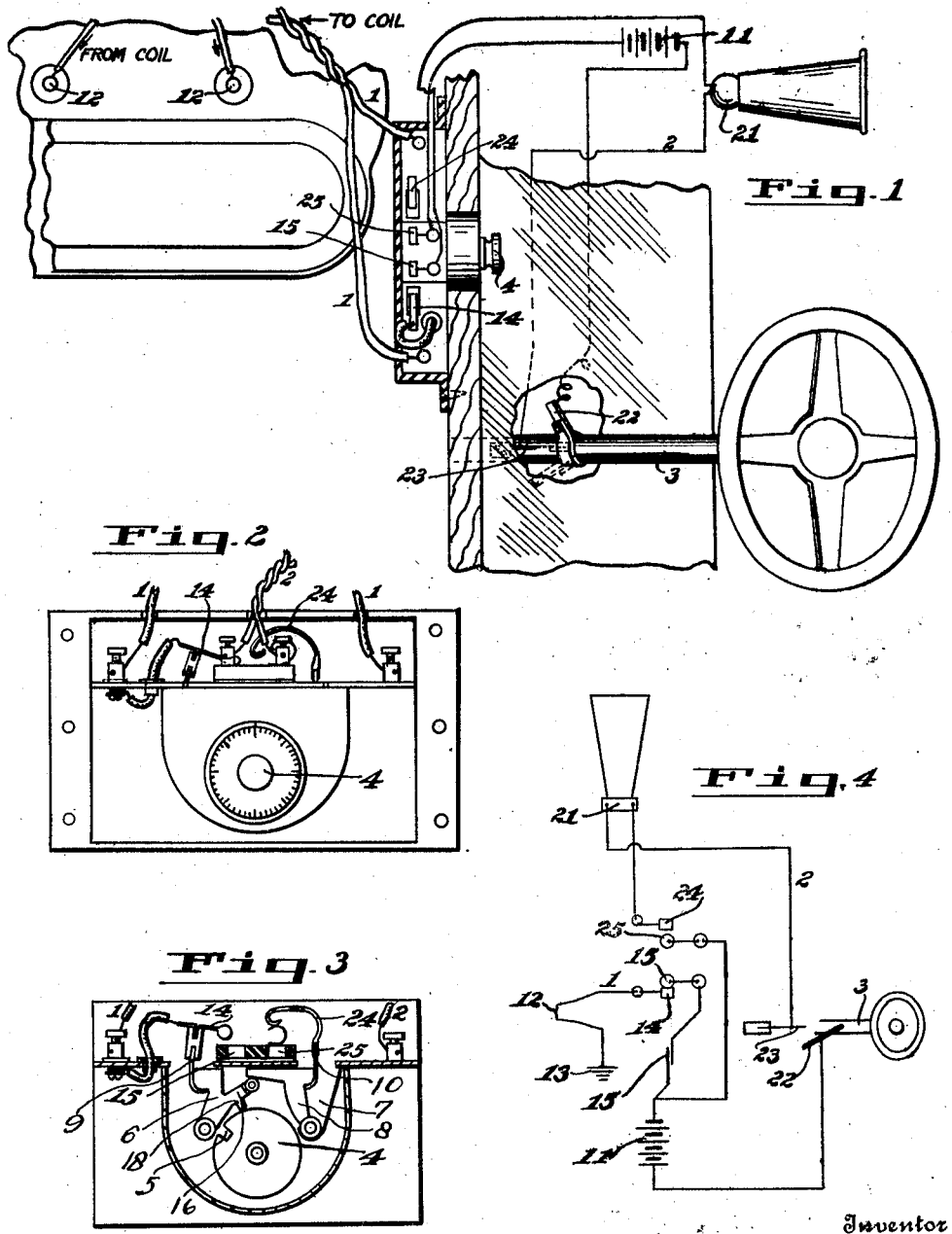

1,437,896

UNITED STATES PATENT OFFICE.

CHARLES A. JOHNSON, OF TACOMA, WASHINGTON.

IGNITION-CONTROLLING MEANS FOR AUTOMOBILES.

Application filed December 17, 1919. Serial No. 345,684.

*To all whom it may concern:*

Be it known that I, CHARLES A. JOHNSON, a citizen of the United States, and resident of the city of Tacoma, county of Pierce, and State of Washington, have invented certain new and useful Improvements in Ignition-Controlling Means for Automobiles, of which the following is a specification.

My invention relates to an ignition controlling means for automobiles, and particularly relates to devices which control the ignition circuit for an automobile and which control at the same time a warning signal.

The object of my invention is to provide a controlling means for automobile ignition circuits which will control also a warning signal which will be sounded if the car is moved by an unauthorized person.

Another object of my invention is to provide a switch for the ignition circuit of an automobile which may be controlled by means of a lock and which will control also and automatically set a warning signal when the ignition circuit is broken.

Another object of my invention is to provide a warning signal which will sound if the car is tampered with by an unauthorized person as soon as the wheels of the car are straightened to steer the car in a straight line.

My invention comprises the novel parts and combinations of parts which are shown in the accompanying drawings, described in the specification, and defined by the claim terminating the same.

In the accompanying drawings I have shown my invention in the form which is now preferred by me.

Fig. 1 is a view of my device mounted upon the dash of an automobile, parts being shown in section and a part of the electric circuit being diagrammatically shown.

Fig. 2 is an elevation of the lock controlled switch which forms a part of my device.

Fig. 3 is a section through the lock controlled switch, parts being shown in a position different from that shown in Figure 2.

Fig. 4 is a diagram illustrating the electrical connections in my device.

When an automobile is left standing for any time at the curb, the front wheels are generally turned until the inner one of them contacts with the curbing. This locks the car against movement in one direction until the wheels are again straightened, and it is certain that the car could not be moved far without straightening the wheels. By my invention, when the wheels are straightened a circuit which includes a special warning signal is closed and the signal is sounded to call the attention of the owner of the car or of passers-by to the fact that the car is being moved by some one unauthorized to move it.

In effect there are two circuits in my device, one of these, as indicated on Figure 4 by 1, may be called the ignition circuit. It includes a suitable source of electric current, as the battery 11, a spark plug 12 and a ground connection as shown at 13; it also includes a switch 14 to be later described, and may include a manually operable switch 15 if this is desired. The second circuit 2 includes the same or a different source of current as 11, though this source should be a battery which is available while the engine is still. The circuit 2 also includes a warning signal or horn 21, and a switch connected to the steering column of the automobile, and also a switch member 24 which is connected to the switch member 25, as will be later described. The warning signal 21 I prefer to place in an inaccessible place upon the automobile, and to use it only in connection with my device.

Upon the steering column of the automobile I fasten a contact point 22 which is secured to move with the steering column and which is included in the circuit 2. The other terminal 23 of the switch is fixed to any suitable portion of the automobile frame or body. It is also included in the circuit 2 and is positioned in such a manner that the terminal 22 will contact with it when the steering column is set to steer the car directly or approximately forward. One of the terminals 23 or 22 I prefer to form of a resilient material to enable it to yield to permit the passage of the other terminal from one side to the other.

The switch members 14 and 24 comprises arms which are movable and which contact respectively with fixed contact points 15 and 25. Any suitable means, as the combination lock mechanism 4, may be employed to control these switch members. The preferred type of lock is illustrated in Figure 3, wherein 4 designates a combination controlled, rotatable disk provided in its edge with a notch 5. Tumblers 6 and 7 are pivotally supported at opposite sides of the disk on pins 8 and these are respectively connected by resilient means, as at 9 and 10, with the arms 14 and 24, to effect movement of the latter by movement of the tumblers. The tumbler 6 has an extension 16 underlying an extension 17 of the tumbler 7 whereby movement of the tumbler 6 effects similar movement of the tumbler 7 and, when the former is permitted to drop toward the disk by the movement of a projecting member 18 thereon into the disk notch which causes the arm 14 to engage the contact point 15 and the arm 24 to be disengaged from the point 25. Also, when the tumbler 6 is raised from the disks by certain adjustment of the combination of the lock, the arm 14 and point 15 will be disconnected and the arm 24 and point 25 connected.

It is intended that the combination lock and the various switches shall be enclosed within steel boxes provided with suitable locks which only authorized persons may open, and that all the circuit wires leading from these switch boxes to the source of electricity shall be extended through steel tubing, so that no one can tamper with or in any way interrupt the circuits.

It will be seen from the above description and from an inspection of Figure 4 that when the ignition circuit is closed the warning signal circuit 2 will be broken by the separation of the points 24 and 25. When the ignition circuit 1 is broken by the separation of the points 14 and 15, the points 24 and 25 will be in contact and the warning signal circuit 2 will be closed, with the exception of the terminals 22 and 23. The automobilist, after driving along side of the curb and setting his front wheels against the curb, shuts off his ignition by manipulation of the mechanism 4. This automatically sets the warning signal 21 as above described. If an attempt is made to straighten the wheels before the contact between points 24 and 25 is broken the circuit 2 will be closed by contact between the points 22 and 23 and the signal will immediately sound to give the warning. If the ignition switch 14, 15, and the warning signal switch 24, 25 are both controlled by the same combination lock mechanism 4, the car cannot be started without operating the combination, and the wheels cannot be straightened to push the car away without sounding the signal 21.

I may include the switch 15 in the ignition circuit in order that the ignition may be quickly shut off and the car left at a stand still, if it is not desired to use the warning signal, by opening the switch 15. The ignition can be shut off without separating the points 14 and 15 and without closing the warning signal circuit through the points 24 and 25. It is immaterial whether the circuit 1 includes the spark plug 12 direct or whether it is connected to the spark plug through a transformer or coil. The circuit 1 represents a circuit through which electrical energy is supplied to the spark plug to ignite the explosive charge in the engine.

What I claim as my invention is:

In a two circuit control lock, a pair of fixed contacts, a pair of switch arms movable into and from circuit closing relation with said contacts, a lock mechanism comprising a rotatable disk having a peripheral notch, a tumbler connected with each of the switch arms, one of said tumblers being supported by the other to effect connection of its switch arm and a contact, an extension on the supporting tumbler normally engaging the periphery of the disk and adapted to seat within the notch thereof upon rotation of the disk to effect connection of its switch arm with the other contact point and disconnection of the other arm and contact, and means for effecting circuit connections with the contacts and switch arms for the purpose set forth.

Signed at Tacoma, Washington, this 28th day of November, 1919.

CHARLES A. JOHNSON.